(12) United States Patent
Zellefrow et al.

(10) Patent No.: US 7,610,646 B2
(45) Date of Patent: Nov. 3, 2009

(54) LAWN SWEEPER

(75) Inventors: Mark Zellefrow, Reynoldsburg, OH (US); Joseph Chattin, Fredericktown, OH (US); Richard Biggs, Pickerington, OH (US)

(73) Assignee: Ohio Steel Industries, Inc., Columbus, OH (US)

( * ) Notice: Subject to any disclaimer, the term of this patent is extended or adjusted under 35 U.S.C. 154(b) by 78 days.

(21) Appl. No.: 11/400,930

(22) Filed: Apr. 10, 2006

(65) Prior Publication Data

US 2006/0230557 A1 Oct. 19, 2006

Related U.S. Application Data

(60) Provisional application No. 60/670,888, filed on Apr. 13, 2005.

(51) Int. Cl.
*E01H 1/04* (2006.01)
(52) U.S. Cl. .................... 15/83; 15/79; 15/82
(58) Field of Classification Search .......... 15/82, 15/83, 79
See application file for complete search history.

(56) References Cited

U.S. PATENT DOCUMENTS

| | | | | | |
|---|---|---|---|---|---|
| 399,316 | A | * | 3/1889 | Palmer | 213/13 |
| 2,253,309 | A | * | 8/1941 | Smellie | 15/332 |
| 3,241,172 | A | * | 3/1966 | Tilgner | 15/183 |
| 4,217,672 | A | * | 8/1980 | Olivari | 15/79.2 |
| 4,267,616 | A | * | 5/1981 | Hunt | 15/182 |
| 5,160,187 | A | * | 11/1992 | Drumm | 300/21 |
| 6,154,920 | A | * | 12/2000 | Petrole et al. | 15/349 |
| 6,463,623 | B2 | * | 10/2002 | Ahn et al. | 15/389 |
| 6,640,532 | B1 | * | 11/2003 | Bogart et al. | 56/400.02 |
| 7,140,062 | B1 | * | 11/2006 | Chen | 15/182 |
| 2002/0007526 | A1 | * | 1/2002 | D'Costa et al. | 15/52.1 |
| 2002/0032948 | A1 | * | 3/2002 | Ahn et al. | 15/389 |

OTHER PUBLICATIONS

AGRI-FAB, Model No. 190-459-100, 46" Heavy Duty Lawnsweeper, Owners Manual, dated Jul. 2002, pp. 1-11, printed in U.S.A.

Sears, Roebuck & Co., Model No. 486.242111, 42" High Performance Lawnsweeper, Owners Manual, dated Jul. 2002, pp. 1-15, printed in U.S.A.

(Continued)

*Primary Examiner*—Joseph J Hail, III
*Assistant Examiner*—Robert Scruggs
(74) *Attorney, Agent, or Firm*—Eley Law Firm Co.; James R. Eley; Michael A. Forhan

(57) ABSTRACT

A towable lawn sweeper comprising a housing, a hitch assembly, a sweeper assembly and a sweeper height adjustment assembly. The hitch assembly is rigidly coupled to the housing and includes a clevis comprising a plurality of connector members forming a plurality of connection positions to adjustably couple the lawn sweeper to a tow vehicle. The sweeper assembly is rotatably coupled to the housing and includes at least one brush that is attached to an axle of the sweeper assembly in a spiral pattern about a longitudinal axis of the axle. The sweeper height adjustment assembly is pivotably coupled to the housing and includes a height adjustment bar pivotally mounted to the housing, a lever extending from the height adjustment bar generally perpendicular, a height retention member pivotally connected to the hitch assembly, and a fastener to releasably secure the lever to the height retention member.

3 Claims, 12 Drawing Sheets

OTHER PUBLICATIONS

AGRI-FAB, Model No. 55-02602-131, 17 Cu. Ft. Heavy Duty Lawnsweeper, Owners Manual, dated Aug. 2003, pp. 1-15, printed in U.S.A.

Brinly-Hardy, Model No. STS-425 LXH, Lawn Sweeper, Owners Manual, undated, pp. 1-11, place where printed/published unknown.

* cited by examiner

LAWN SWEEPER

This application claims priority to U.S. Provisional Application No. 60/670,888 filed Apr. 13, 2005, the contents of which are hereby incorporated by reference.

FIELD OF THE INVENTION

This invention relates generally to lawn sweepers and, more particularly, to a lawn sweeper having an adjustable hitch, an improved sweeper, and a sweeper height adjustment feature.

BACKGROUND

A typical lawn sweeper generally includes a brush assembly having a plurality of rotatable brushes driven by a pair of wheels that are in contact with the ground. The lawn sweeper is towed behind a lawn implement, causing the wheels and, in turn, the brushes to rotate. The brushes sweep yard clippings and other debris from an underlying ground surface into a hopper or bag located behind the brushes.

Although current lawn sweepers are generally effective, there is room for improvement. One drawback of current lawn sweepers relates to a tow bar of the sweeper which is connected by means of a hitch to a draw bar of an associated lawn implement, such as a tractor, mower, or all-terrain vehicle. When attached to the tractor the tow bar should be generally parallel to the ground. If the tow bar is not generally parallel to the ground the efficiency of the lawn sweeper may be adversely affected. For example, at one non-parallel extreme position of the tow bar the brushes of the lawn sweeper may not properly contact the ground, reducing the amount of material collected by the lawn sweeper. At another non-parallel extreme, components of the sweeper may drag along the ground, causing damage or premature wearout of sweeper components. Attempts have been made by others to provide an adjustable clevis to solve this problem, such as that disclosed by U.S. Pat. No. 6,640,532 issued to Bogart, et al. However, such adjustable devises typically comprise detachable components that must be aligned with openings of the tow bar and then secured to the tow bar with mounting hardware. The detachable components are subject to being lost which could render the lawn sweeper unusable. Adjustment of current clevis hitches with respect to the tow bar may also require the use of tools which can be inconvenient and time-consuming for the user.

Another shortcoming of current lawn sweepers relates to the rotating brushes. In particular, current designs typically employ a plurality of linear or straight brushes that are longitudinally attached to a rotating axle. A confronting edge of each brush contacts the ground generally along the full length of the brush when the brush assembly is rotating, causing relatively high transitory loading stresses to be placed upon the brush assembly and associated components, such as support structures and drive gears of the lawn sweeper. The high loading stresses tend to reduce the useful life of these devices.

Yet another area for improvement of current lawn sweeper designs is the height adjustment feature. This feature is important to the operation of the sweeper because the brush height must be adjusted for optimal performance under various conditions. For example, the optimum brush height for sweeping leaves from a grass lawn varies with the length of the grass. Likewise, the brush height for sweeping driveways or sidewalks may also differ from that used for sweeping grass. Generally, current lawn sweepers have some form of an adjustable friction control device, such as a knob, that may be loosened to allow the brush height to be adjusted, then re-tightened to hold the sweeper at the selected height. This type of system has several drawbacks. First, the knob and associated components, such as washers, screws and nuts, are subject to being lost if the knob vibrates loose during operation, which could render the sweeper unusable. The knob may also loosen during use and allow the brush height to change without the knowledge of the operator, thereby degrading the efficiency of the lawn sweeper and even potentially damaging the lawn sweeper. In addition, tightening the knob sufficiently so that it does not inadvertently loosen can be difficult because the operator is often required to hold the sweeper at the desired height while simultaneously tightening the knob.

There is a need for a lawn sweeper having an easily-adjustable hitch clevis whose components are less prone to loss. There is an additional need for a lawn sweeper having a more efficient brush assembly. Further, a need exists for a lawn sweeper having a height adjustment feature that is not prone to inadvertent loosening.

SUMMARY

A lawn sweeper is disclosed according to an embodiment of the present invention. The lawn sweeper includes a sweeper brush configuration wherein the brushes are spiraled about an associated axle. The lawn sweeper further includes an adjustable clevis. A height adjustment assembly provides ease of adjustments while reducing the risk of inadvertent loosening and loss of sweeper components.

According to several aspects of the present invention the towable lawn sweeper comprises a housing, a hitch assembly, a sweeper assembly and a sweeper height adjustment assembly. The hitch assembly is rigidly coupled to the housing and includes a clevis comprising a plurality of connector members forming a plurality of connection positions to adjustably couple the lawn sweeper to a tow vehicle. The sweeper assembly is rotatably coupled to the housing and includes at least one brush that is attached to an axle of the sweeper assembly in a spiral pattern about a longitudinal axis of the axle. The sweeper height adjustment assembly is pivotably coupled to the housing and includes a height adjustment bar pivotally mounted to the housing, a lever extending from the height adjustment bar generally perpendicular, a height retention member pivotally connected to the hitch assembly, and a fastener to releasably secure the lever to the height retention member.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

In the discussion that follows, like reference numbers are used to indicate like elements in the various figures.

Figure 1A:
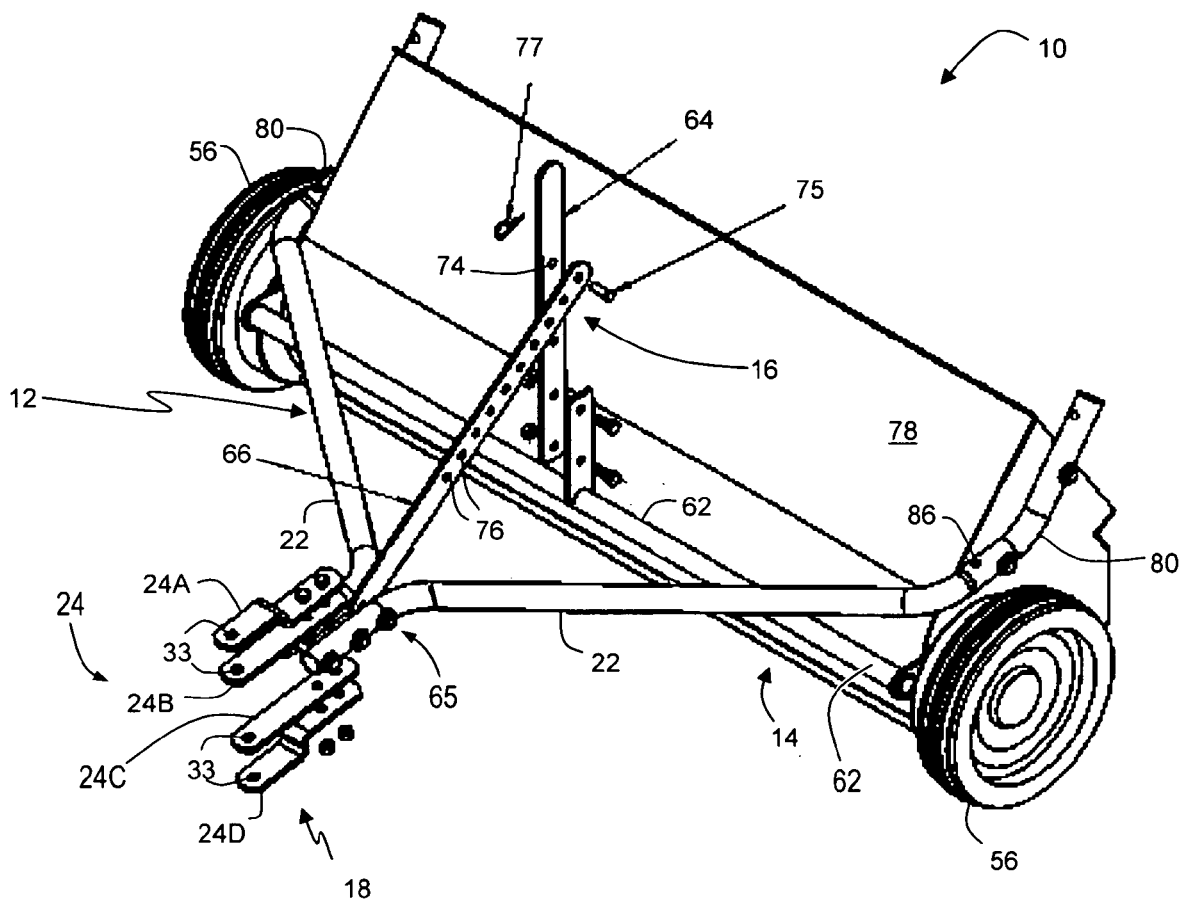
FIG. 1A shows the general arrangement of a lawn sweeper according to an embodiment of the present invention.

FIG. 1A depicts a lawn sweeper 10 comprising a hitch assembly 12, a sweeper assembly 14 and a height adjustment assembly 16 according to an embodiment of the present invention. Hitch assembly 12 may further comprise a clevis 18 for connecting the lawn sweeper 10 to a tow vehicle.

Hitch Assembly

Figure 1B:
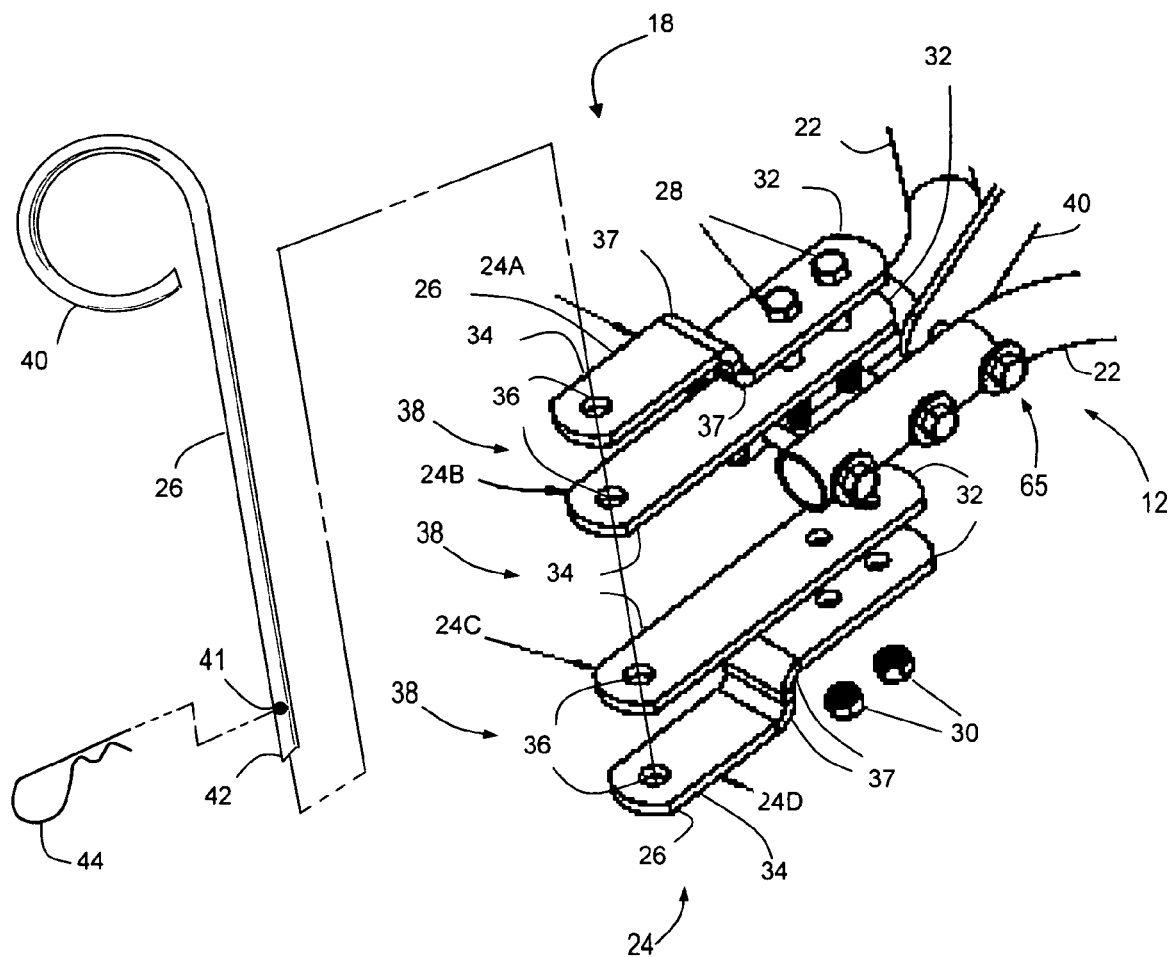
FIG. 1B depicts an exploded view of a clevis portion of the lawn sweeper of FIG. 1A.

With additional reference to FIG. 1B, clevis 18 comprises a plurality of connector members 24A, 24B, 24C and 24D (collectively "connector members 24"), a hitch pin 26 and fasteners, such as bolts 28 and nuts 30.

Connector members 24 may each have two opposing ends, shown in the figures as an attachment end 32 and a clevis end 34. Connector members 24 are assembled to hitch assembly 12 at their attachment ends 32 which includes corresponding openings or fixtures suitable for the method of attachment to be used. The clevis ends 34 of connector members 24 may each include an opening 36 to receive a hitch pin 26, the openings being generally vertically aligned with each other.

Clevis 18 may be assembled to hitch assembly 12 by vertically stacking connector members 24A, 24B, 24C, 24D, as shown in FIG. 1B. The inner two connector members 24B, 24C may be generally planar, while upper connector member 24A and lower connector member 24D may further include two opposing bends 37 along their longitudinal length to create a first spaced-apart portion 38. A second spaced-apart portion 38 is formed by connector members 24B and 24C, these connector members being separated by one or more tow tubes 22 of hitch 12. Bends 37 may be made in other configurations, such as with greater or fewer bends, different angles or placing the bend at different locations along the length of connector members 24A and 24D. A third spaced-apart portion is formed by connector members 24C and 24D, as shown in FIG. 1B.

Figure 3:
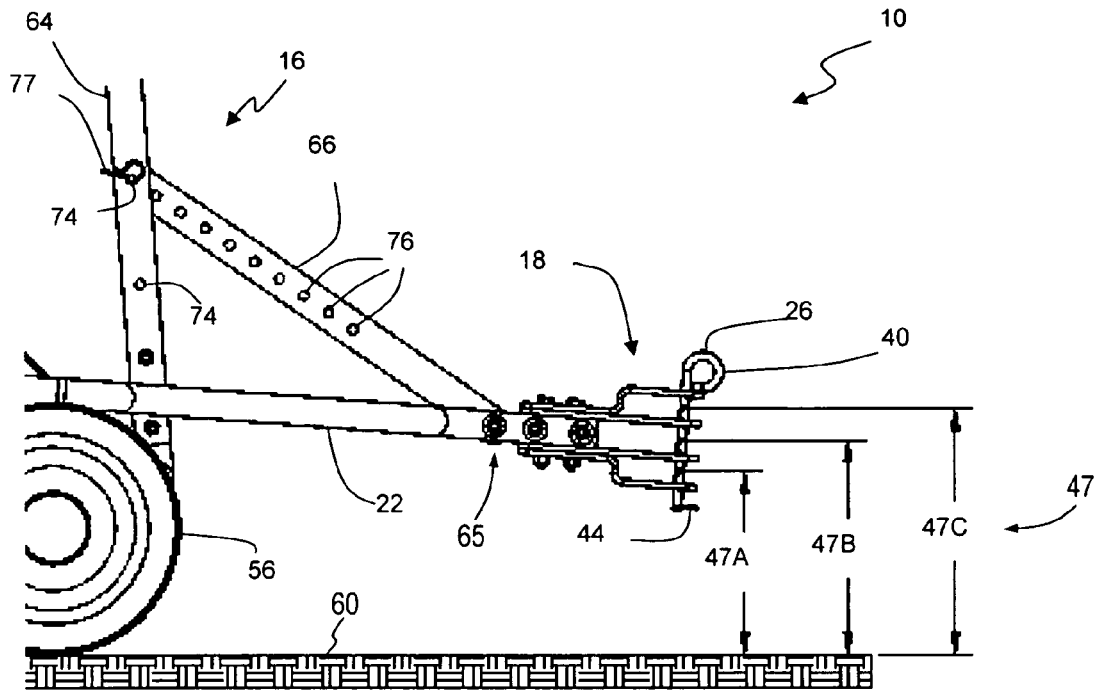
FIG. 3 is a side elevational view of a hitch assembly and clevis of the lawn sweeper of FIG. 1A, depicting a plurality of selectable connection heights.
Figure 4:
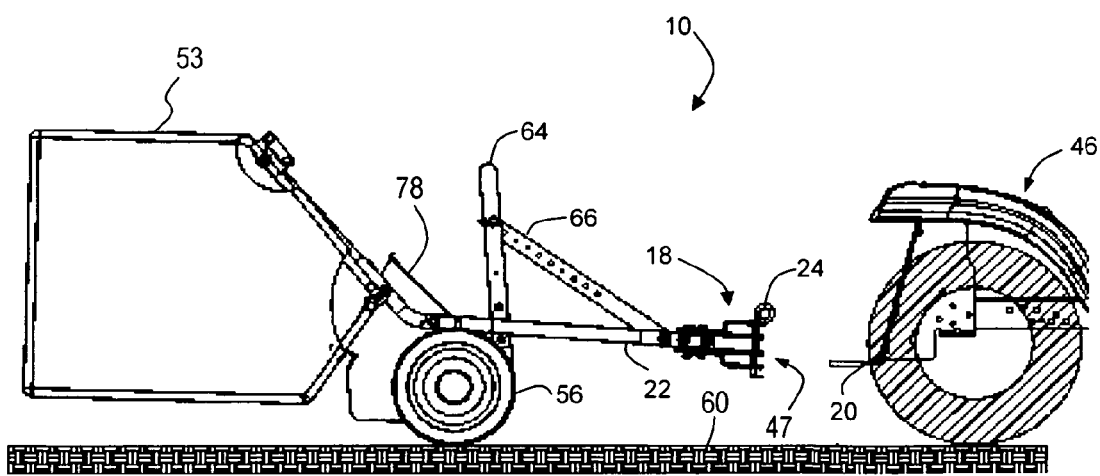
FIG. 4 is a side elevational view of the lawn sweeper of FIG. 1A being coupled to a draw bar of a lawn tractor.

Connector members 24 may be coupled to tow tubes 22 of hitch 12 with fasteners such as, without limitation, bolts 28 and nuts 30. Other attachment means include rivets, clamps, screws and welding. Connector members 24B and 24C may be separated by tow tubes 22 of hitch assembly 12, as depicted in FIG. 1B, or with an appropriately sized spacer, such as a generally rectangular block (not shown). Openings 36 of the clevis ends 34 of connector members 24 are generally vertically aligned when the connector members are coupled to hitch 12 such that a hitch pin 26 may be inserted through the holes, as depicted in FIGS. 1B, 3 and 4.

Connector members 24 may be made from any material with sufficient strength and durability to withstand the environment and forces to which a lawn sweeper 10 is typically exposed. Example materials include, without limitation, steel and aluminum. Further, connector members 24 may be produced by any suitable method such as stamping, forging, molding, lay up or casting, among others.

Figure 2:
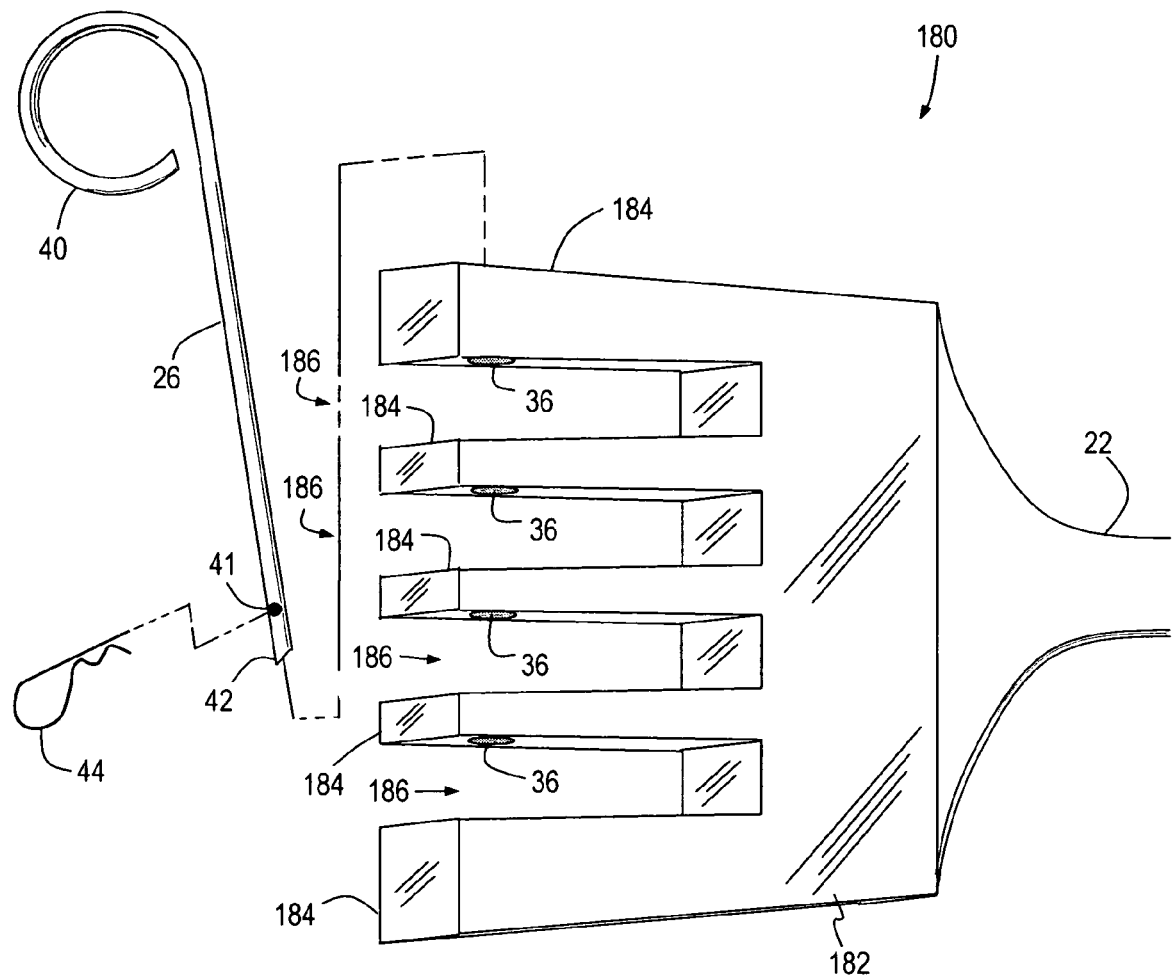
FIG. 2 is a perspective view of a clevis according to an alternate embodiment of the present invention.

In an alternate embodiment of the present invention a clevis 180 may be made from a unitary material having a body 182, a plurality of extensions 184 and spaces 186, as depicted in FIG. 2. Clevis 180 may be coupled to tow tubes 22 in any conventional manner, including fasteners as discussed above for connector members 24.

With reference to FIGS. 1B and 2, hitch pin 26 may be configured having any shape that is suitable for the applied loads and environment for lawn sweeper 10. Hitch pin 26 may contain a loop 40, bend, tab, widened section or other feature to keep its trailing end from passing through openings 36 and provide a grasping means for disengagement. In addition, it may be pierced with an aperture 41 near its leading end 42 for the insertion of a cotter pin 44 or other device to removably retain the hitch pin installed within clevis 18, 180 as depicted in FIGS. 1B, 2 and 3.

Referring now to FIGS. 3 and 4, in use clevis 18 may be utilized to couple lawn sweeper 10 to a lawn tractor 46. To make such a connection, clevis 18 of the present invention provides a plurality of selectable connection positions, 47A, 47B and 47C (collectively "connection positions 47") as shown in FIG. 3. Any of connection positions 47 may be selected by initially raising clevis 18 to a height at which tow tubes 22 are generally parallel with the ground. Clevis 18 may then be positioned proximate a draw bar 20 of a lawn tractor 46, as seen in FIG. 4. The preferred or optimum connection position 47A, 47B or 47C is then selected by determining which connection position is most directly aligned with draw bar 20 while tow tubes 22 are generally parallel with the ground. Draw bar 20 may then be inserted into the selected connection position 47A, 47B or 47C and hitch pin 26 inserted through openings 36 (FIG. 1B) and a generally coaxially aligned opening (not shown) of the draw bar to retain the connection. Additional methods may also be utilized for determining the appropriate connection position 47A, 47B or 47C, such as measuring draw bar 20 height and connection position heights above the ground and selecting the most nearly matching connection position, among other methods. Clevis 180 of FIG. 2 is coupled to a lawn tractor in a similar manner and thus will not discussed further here.

Sweeper Assembly

Figure 5:
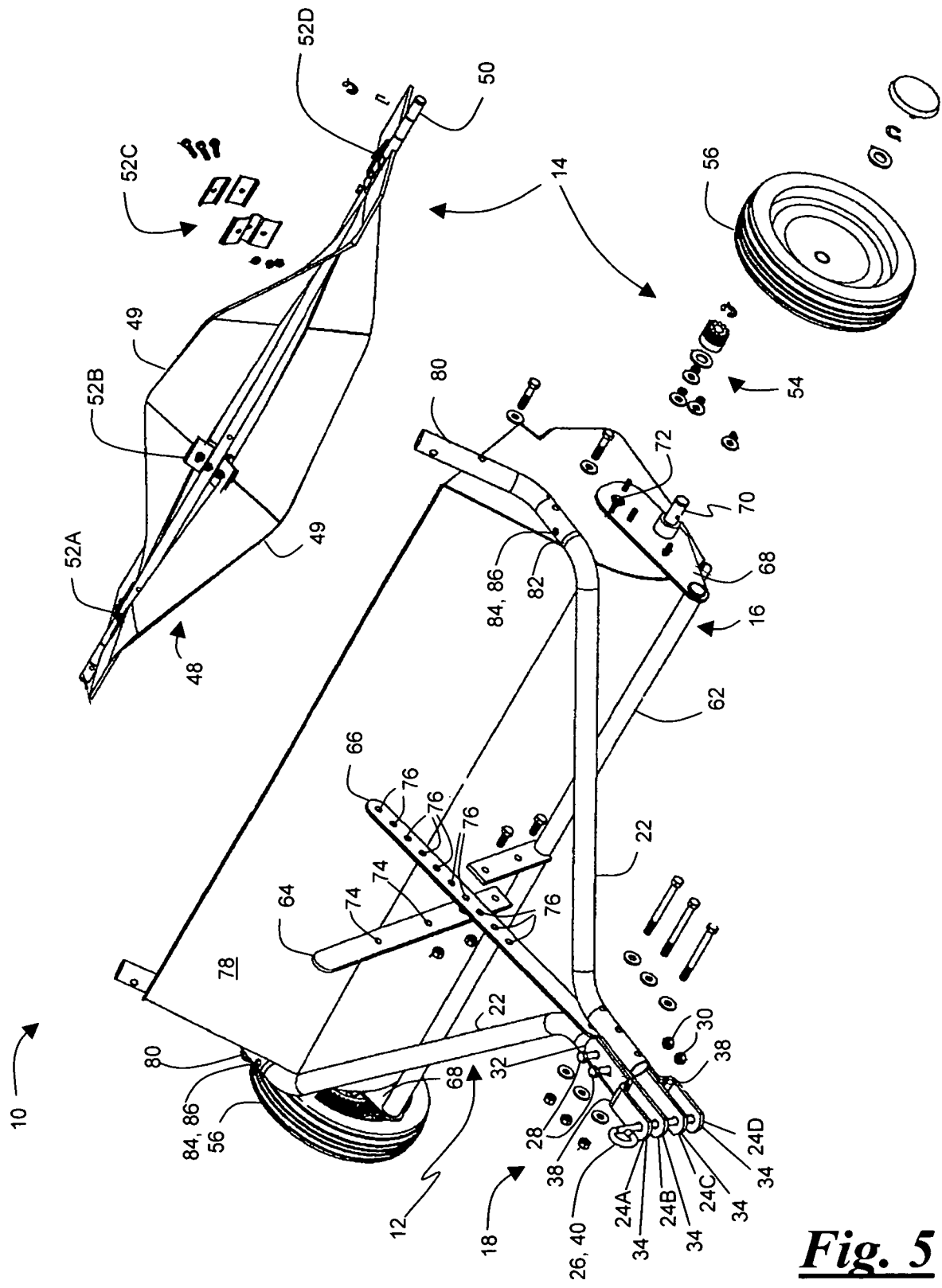
FIG. 5 is an exploded view of the lawn sweeper of FIG. 1A.
Figure 6:
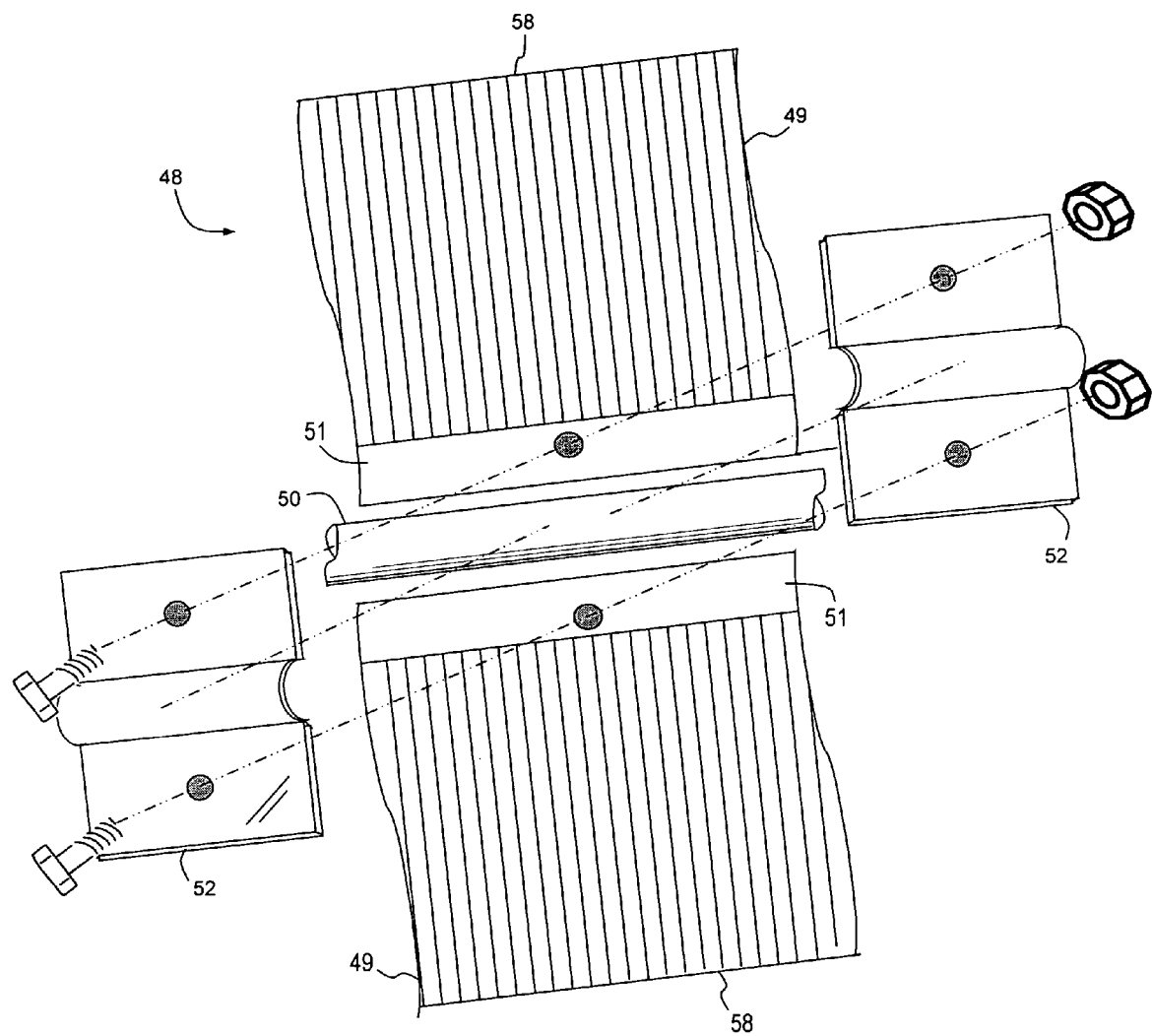
FIG. 6 is an exploded view of a portion of a brush assembly of the lawn sweeper of FIG. 1A.
Figure 7:
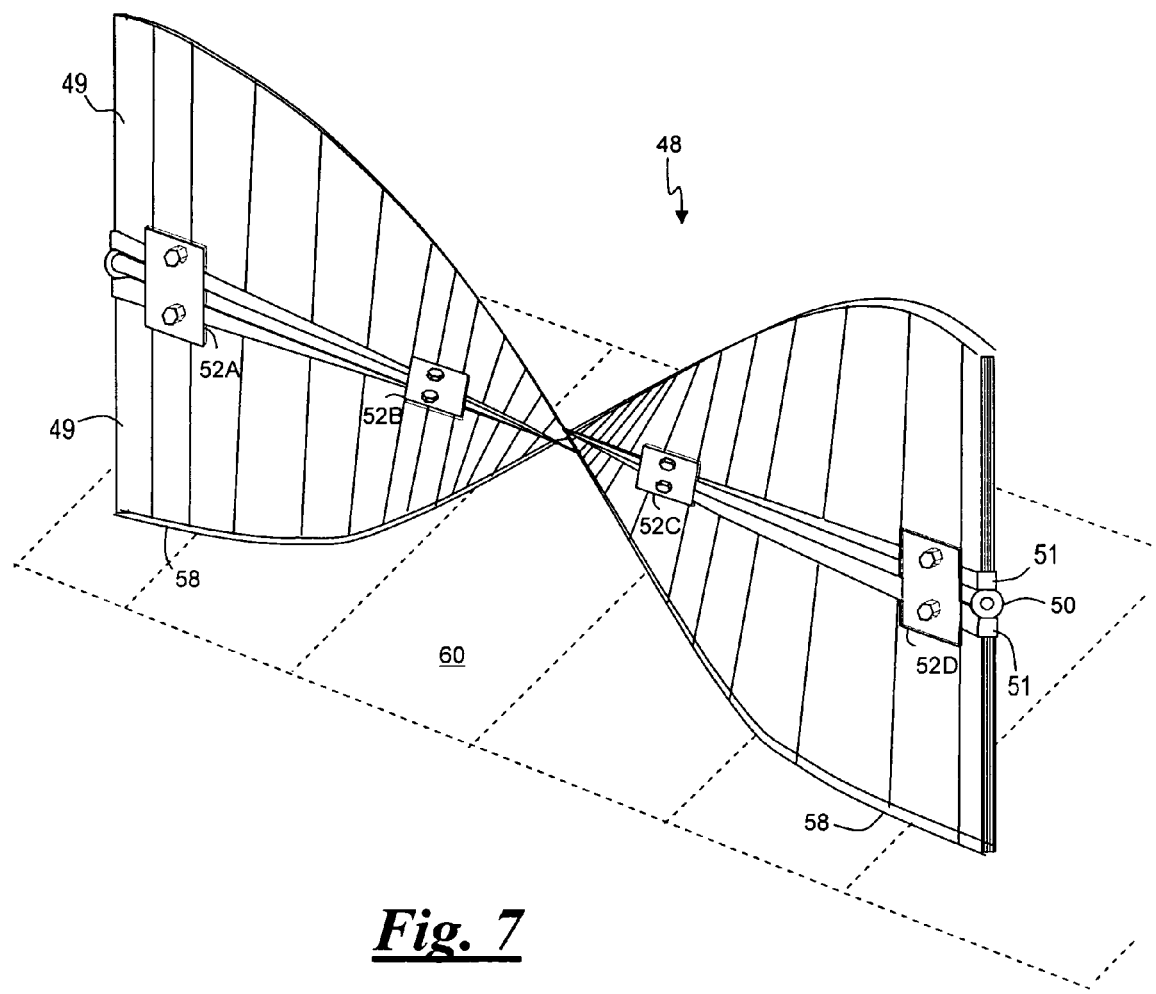
FIG. 7 is an expanded view of the spiraled brushes of the lawn sweeper of FIG. 1A.
Figure 8:
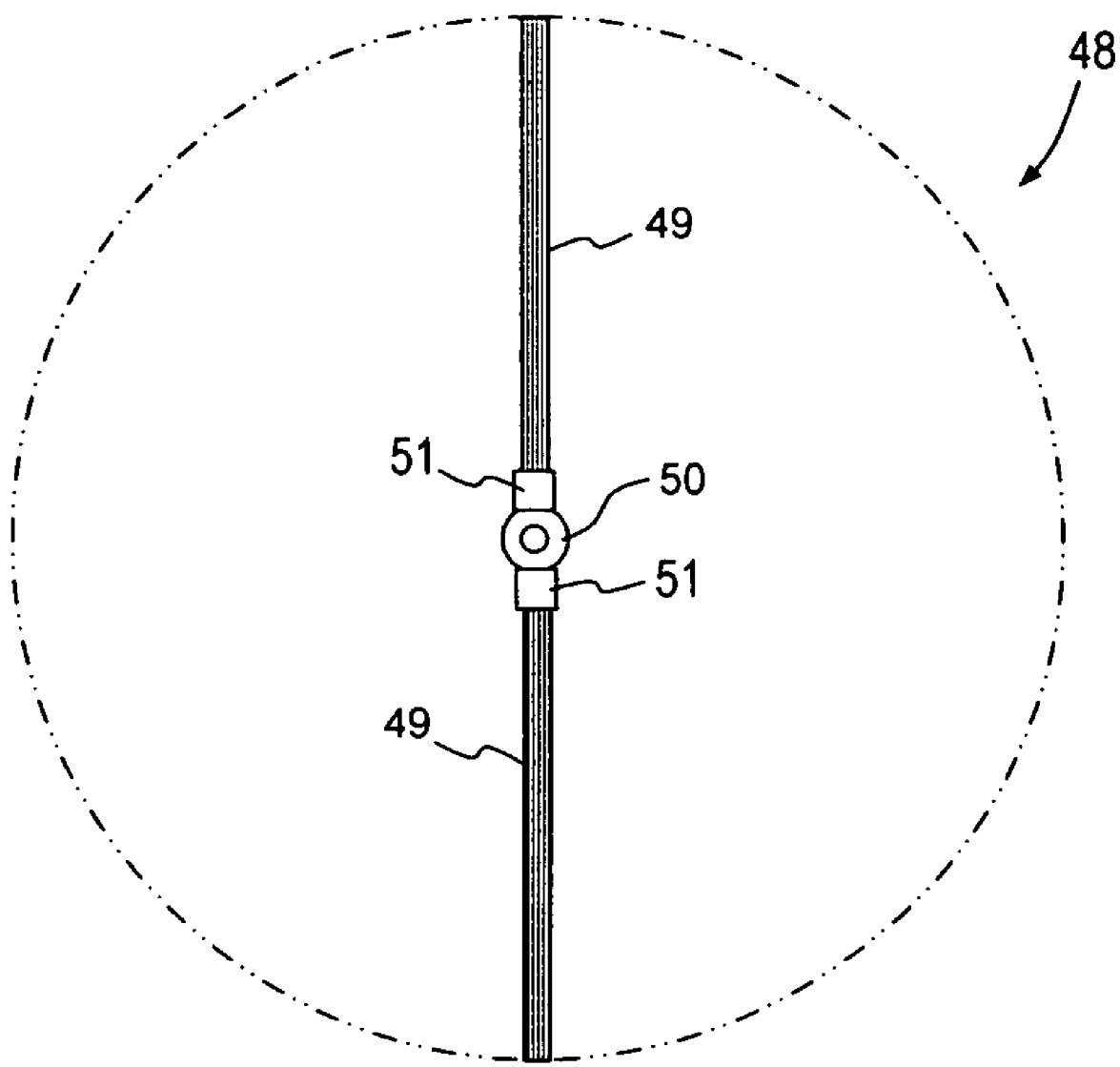
FIG. 8 is an end elevational view of the brush assembly spiral configuration of the lawn sweeper of FIG. 7.

Referring now to FIGS. 5, 6, 7 and 8, sweeper assembly 14 may include a brush assembly 48 having a plurality of brushes 49 attached to an axle 50 with a plurality of clamps 52A, 52B, 52C, and 52D (collectively "clamps 52"). Brushes 49 are attached to axle 50 in a generally spiral configuration by means of an attachment bracket 51. The spiral configuration may be produced by manipulating brushes 49 such that the brushes twist about axle 50 as they traverse longitudinally from one end of the axle to the other. Brushes 49 may twist in a half-revolution of about 180 degrees about axle 50 as depicted in FIGS. 5 and 7 or may be spiraled by a lesser or greater degree, as suitable for a particular configuration of lawn sweeper 10. In one embodiment a pair of brushes are opposingly attached to axle 50 and extend generally away from the axle in opposite directions, as shown in the figures.

Brushes 49 preferably have suitable pliability characteristics to provide sufficient sweeping force for sweeping debris and sufficient wear properties to provide an adequate service life, among others. In some embodiments the brushes 49 may extend the full length of axle 50, or may extend over only a portion of the axle's length. The brush bristles may be of any desirable length commensurate with the size and shape of sweeper 10, and their length may be either generally constant or variable throughout brush assembly 48. Further, the bristles employed in brushes 49 may be associated in any desirable pattern or arrangement to produce the desired thickness, stiffness, coarseness, and bristle density, among other characteristics. Brushes 49 may be made from of any suitable bristle composition such as nylon, plastic, metal and organic fibers, among others, and may have any suitable bristle properties such as smooth surface, rough surface, round cross-section, angular cross-section, monofilament or multi-filament.

Axle 50 may be any suitable type of mechanism capable of retaining and rotating brushes 49 during operation of lawn sweeper 10. Axle 50 may have located at one or both ends, devices such as gear teeth, hubs, a clutch or other mechanisms (hereinafter referred to generally as "gears 54"), as depicted in FIG. 5, for rotating the axle and, in turn, brush assembly 48. Alternatively, gears 54 may be driven by rotation of wheels 56 of lawn sweeper 10 or from another source such as a gas or electric motor (not shown). Axle 50 may be made from of any suitable material such as metal or plastic in the form of rod, tube or other suitable form that provides adequate strength, durability and environmental compatibility, among other properties required by lawn sweeper 10.

Referring to FIGS. 5, 6 and 7, a plurality of clamps 52 are shown to fixedly attach brushes 49 to axle 50. Clamps 52 may be, without limitation, clips, clamps, grooves, slots, tabs, screws, nuts, bolts, glues, welds, notches and adhesives. In one embodiment clamps 52 may comprise metal brackets attached to opposing sides of axle 50 and secured with a screw or bolt inserted therein to retain brushes 49, as depicted in FIG. 6.

The twisted configuration of brush assembly 48 may be achieved by initially loosely attaching brushes 49 to opposing sides of axle 50 in a generally linear fashion with clamps 52. Clamp 52A, near a first end of brush assembly 48, may then be attached to axle 50 by inserting a bolt, screw, welding or by another method, so as to restrict any movement of brushes 49 about the first end of the axle, as depicted in FIGS. 6 and 7. Clamp 52D, near a second end of brush assembly 48, may then be rotated about axle 50 a desired amount, generally approximately 180 degrees and then attached to the axle by inserting a bolt, screw, welding or by another method. Intermediate clamps 52B and 52C may then be attached to axle 50 in a like manner. When assembled, brushes 49 curve or spiral about axle 50 to form brush assembly 48. Other embodiments may utilize a greater or lesser number of rotations of brushes 49 about axle 50 and/or may utilize other methods of attaching the brushes to the axle. Further, a greater or lesser number of brushes 49 may be employed.

In operation sweeper assembly 14 sweeps debris from work surface 60 by rotating brush assembly 48 about axle 50. In the present invention, rotation of axle 50 and associated brush assembly 48 is achieved by towing lawn sweeper 10 with lawn tractor 46 (FIGS. 4 and 5). Towing lawn sweeper 10 causes rotation of wheels 56 which thereby rotatably drives gears 54 operatively coupled to the wheels and axle 50. Thus, gears 54 rotate axle 50 and associated brush assembly 48. Gears 54 may be designed to provide rotation of axle 50 in clockwise or counterclockwise directions and gear ratios may be utilized that provide multiple or partial rotations of the axle and brush assembly for every single rotation of wheels 56. By rotating brush assembly 48 a varying portion of a confronting edge 58 along the leading side of the brushes 49 contact a work surface 60. Generally, gears 54 provide a rotational speed to brush assembly 48 greater than the translational speed of lawn sweeper 10, thereby allowing the brush assembly to sweep across work surface 60 and move debris across or away from the work surface. The bristles of brushes 49 are configured to have adequate strength and stiffness to apply a force to work surface 60 to loosen and/or sweep debris from the surface.

Figure 9:
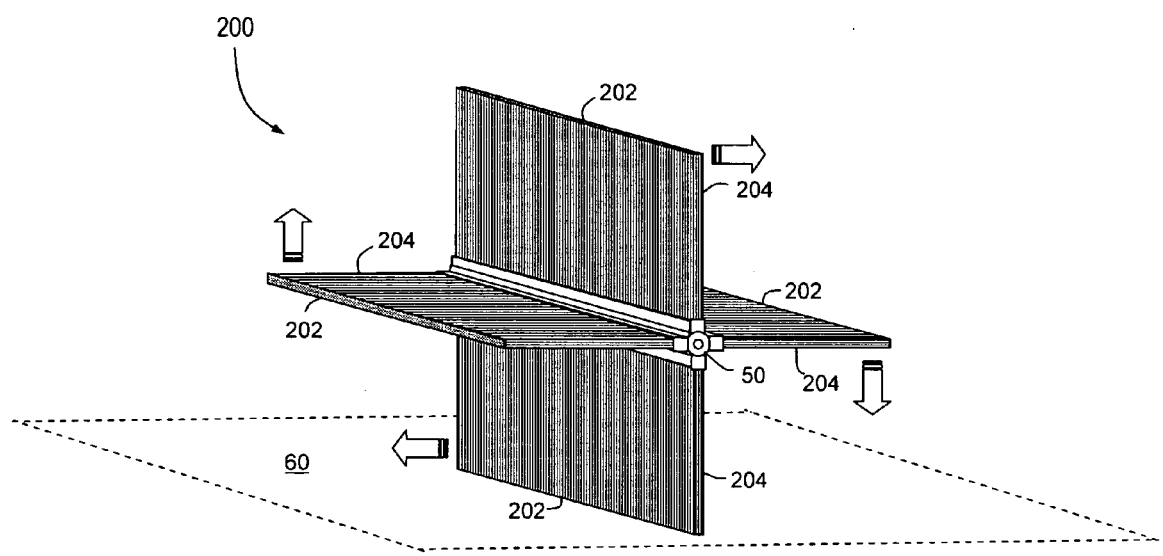
FIG. 9 shows a view of a prior art brush assembly.

In comparing FIGS. 7 and 9, brush assembly 48 provides a number of advantages over current brush designs. As depicted in FIG. 9, a confronting edge 202 of brushes 204 of a brush assembly 200 that contacts work surface 60 at a given time in a linear or non-curved brush configuration extends essentially across the full width of the brush assembly. Consequently, the available rotational force of brush assembly 200 must be distributed across the entire confronting edge 202 of each brush 204, thereby reducing the effectiveness of the brushes. Further, a linear brush design may produce transitory increases or "spikes" in the forces imposed upon brush assembly 200. Each time a linear brush 204 contacts work surface 60 a momentary increase in force may be encountered. Consequently, to function effectively the amount of force required to keep brush assembly 200 rotating may be significant, placing stress on the lawn sweeper components. These stresses promote wear and damage to brush assembly 200 and other components of a lawn sweeper 10, such as bearings and gears, thereby shortening their service life. To counteract these drawbacks materials and components with greater strength and wear properties are required, increasing the cost and complexity of the lawn sweeper 10.

In contrast, with reference to FIG. 7, the present invention allows only a portion of the confronting edge 58 of brush assembly 48 to contact the work surface 60 at any given time. Such a configuration provides several advantages. First, decreasing the length of brush assembly 48 that contacts the work surface 60 at any given time the force applied by the brush assembly to the work surface may be concentrated along that decreased length. As a result, the force applied by brush assembly 48 against surface 60 is increased. The effectiveness of brush assembly 48 is accordingly increased, as there is a greater concentration of force available to sweep debris. The present invention also decreases the overall stress placed on the lawn sweeper 10 components. This is a result of concentrating the available force for sweeping along a smaller portion of brush assembly 48, thereby reducing the overall force required to provide adequate force for sweeping. In addition, the spiraled brush assembly 48 configuration may reduce or eliminate the aforementioned variations in force seen in linear brush designs, because a relatively constant portion of brushes 49 are always in contact with the work surface 60 as the spiraled brush assembly 48 rotates. As a result, generally constant forces are imposed upon brush assembly 48 and lawn sweeper 10 during operation. Since the peak loading stresses placed on brush assembly 48 and on lawn sweeper 10 components are decreased, wear and damage to the components is correspondingly decreased, increasing their service life. These characteristics may allow the utilization of less expensive materials and simpler designs in the construction of lawn sweeper 10 components, thereby reducing the cost and complexity of lawn sweeper 10.

Height Adjustment Assembly

Referring now to FIGS. 1A, 5, 10A and 10B, height adjustment assembly 16 may be used to adjust the height of sweeper assembly 14 above the ground in order to provide optimal operation of brush assembly 48. The height adjustment assembly 16 of the present invention includes a height adjustment bar 62, a lever 64 and a height retention member 66 as represented in FIGS. 1A and 5.

As depicted in FIG. 5, height adjustment bar 62 is oriented generally transverse to the direction of travel of lawn sweeper 10, extending between wheels 56. At each end of height adjustment bar 62 is attached a plate 68 having a spindle 70 for mounting a wheel 56. Plate 68 also includes an aperture 72 for inserting a bolt or other fastener, or a member for connecting the height adjustment bar 62 to a housing 78, as depicted in FIG. 5. The attachment of height adjustment bar 62 to housing 78 is such that the height adjustment bar may pivot about aperture 72, thereby changing the distance between spindles 70 and the ground 60. By changing this distance sweeper assembly 14 may be raised or lowered above the ground.

Lever 64 includes a plurality of spaced-apart apertures 74 along its length, and extends generally perpendicular from height adjustment bar 62. Lever 64 may be attached directly to height adjustment bar 62 by welding, bolting or any other suitable method. Alternatively, height adjustment bar 62 may include an integral member extending from its surface, to which lever 64 may be connected.

Height retention member 66 also includes a plurality of spaced-apart apertures 76 along its length, oriented such that the apertures align with apertures 74 of lever 64. Height retention member 66 is pivotally connected to hitch assembly 12 by a fastener 65, such as a bolt and nut inserted through tow tubes 22 and the height retention member (FIGS. 1A and 1B), and extends generally toward sweeper assembly 14.

Height adjustment bar 62 and plate 68 may be made from tubing, bar stock or plate, among others, and made from steel, iron, alloys, composites, heavy duty plastics or other suitable materials. Likewise, lever 64 may be shaped as a generally longitudinal, planar member as depicted in FIG. 5. In other embodiments lever 64 may be a tube, bar or other form and may likewise be made from steel, iron, alloys, composites, heavy duty plastics or other suitable materials. Height retention member 66 may be constructed from similar materials as lever 64, as seen in FIG. 5.

Figure 10A:
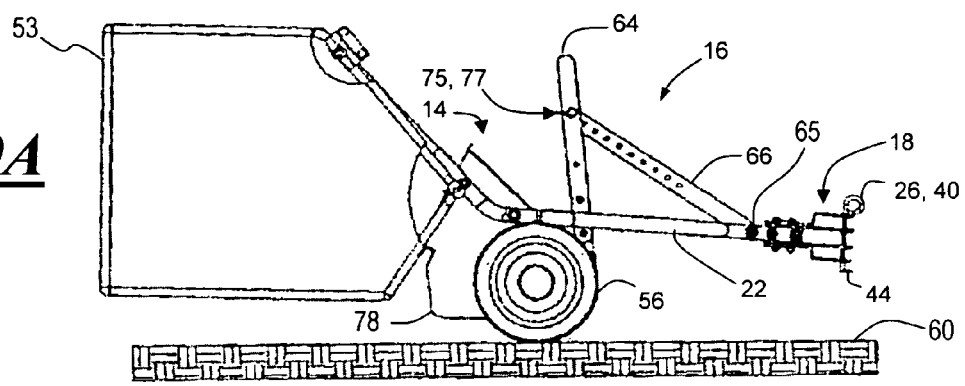
FIG. 10A is a first side elevational view of a lawn sweeper according to an embodiment of the present invention, depicting a height adjustment provided by the height adjustment assembly.
Figure 10B:
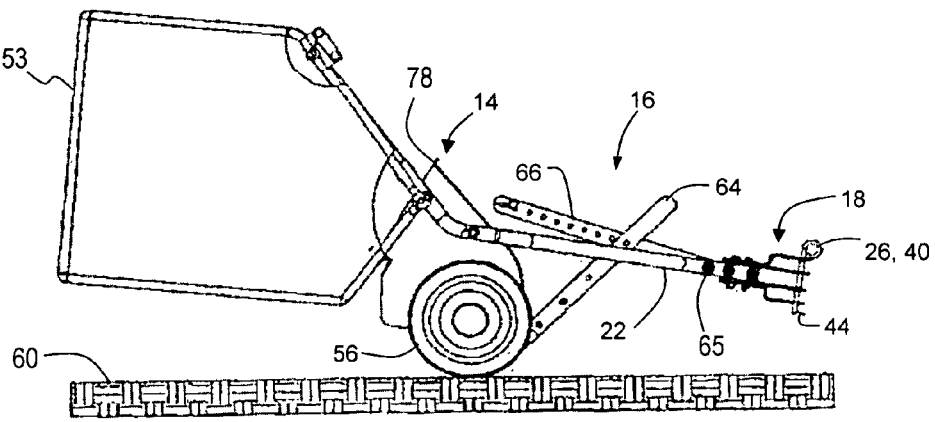
FIG. 10B is a second side elevational view of a lawn sweeper according to an embodiment of the present invention, depicting another height adjustment provided by the height adjustment assembly.

With continuing reference to FIGS. 1A, 5, 10A and 10B, in operation height adjustment bar 62 is pivotally attached to housing 78 and lever 64 is fixedly attached along and extending from the length of the height adjustment bar, as previously described. Lever 64 is located proximate the midpoint of height adjustment bar 62 and is oriented such that it extends generally vertically when lawn sweeper 10 is at its minimum adjustable height as depicted in FIG. 10B. Conversely, lever 64 extends toward a point proximate hitch assembly 12 when the lawn sweeper is at its maximum adjustable height, as depicted in FIG. 10A. Height retention member 66 is pivotally attached to hitch assembly 12, extending rearwardly therefrom, and connecting to lever 64 at a selectable point along their respective lengths with a pin 75 and a clip 77 inserted through adjacent apertures 74, 76. This configuration may thus be employed to adjust the height of lawn sweeper 10, i.e., the distance between brush assembly 48 and work surface 60, to provide the desired sweeping arrangement.

Pin 75 may generally be made of metal and may comprise a clevis pin or other similar component, and further may utilize clip 77 such as a hairpin cotter, or other component to retain the pin within the perforations 74, 76.

Lawn sweeper 10 may be raised by moving lever 64 toward clevis 18, thereby pivoting height adjustment bar 62 downwardly. By pivoting height adjustment bar 62 downwardly, the relationship between wheels 56 connected along plates 68 of the height adjustment bar is adjusted such that the wheels are pivoted generally underneath the lawn sweeper and the distance between the wheels and lawn sweeper is increased. The desired lawn sweeper 10 height may be retained by aligning a selected aperture 76 of height retention member 66 with a selected aperture 74 of lever 64 and inserting pin 75 through the aligned apertures. A clip 77 may then be inserted through a hole in pin 75 to retain the pin within the apertures. A similar process may be utilized to lower lawn sweeper 10 such that lever 64 is moved away from clevis 18 to move lawn sweeper 10 closer to the ground.

As shown in FIG. 1A, hitch assembly 12, sweeper assembly 14 and height adjustment assembly 16 may be integrated with housing 78 to form lawn sweeper 10. Housing 78 may be of any shape or configuration compatible with the assemblies of lawn sweeper 10. As shown in FIG. 5, sweeper assembly 14 may be rotatably attached to housing 78 by means of axle 50 and gears 54. Height adjustment assembly 16 is also attached to housing 78 through fixtures attached to, or extending from the appendages of height adjustment bar 62. Wheels 56 of height adjustment assembly 16 may then be operatively coupled to gears 54 for rotating axle 50. Housing 78 may generally be designed to provide sufficient strength and durability for connecting and retaining the assemblies of the present invention while also providing an enclosure for brush assembly 48. Housing 78 may generally be made of sheet steel or aluminum, but may also be made of other metals, or suitable plastics in various shapes and formulae.

Figure 11:
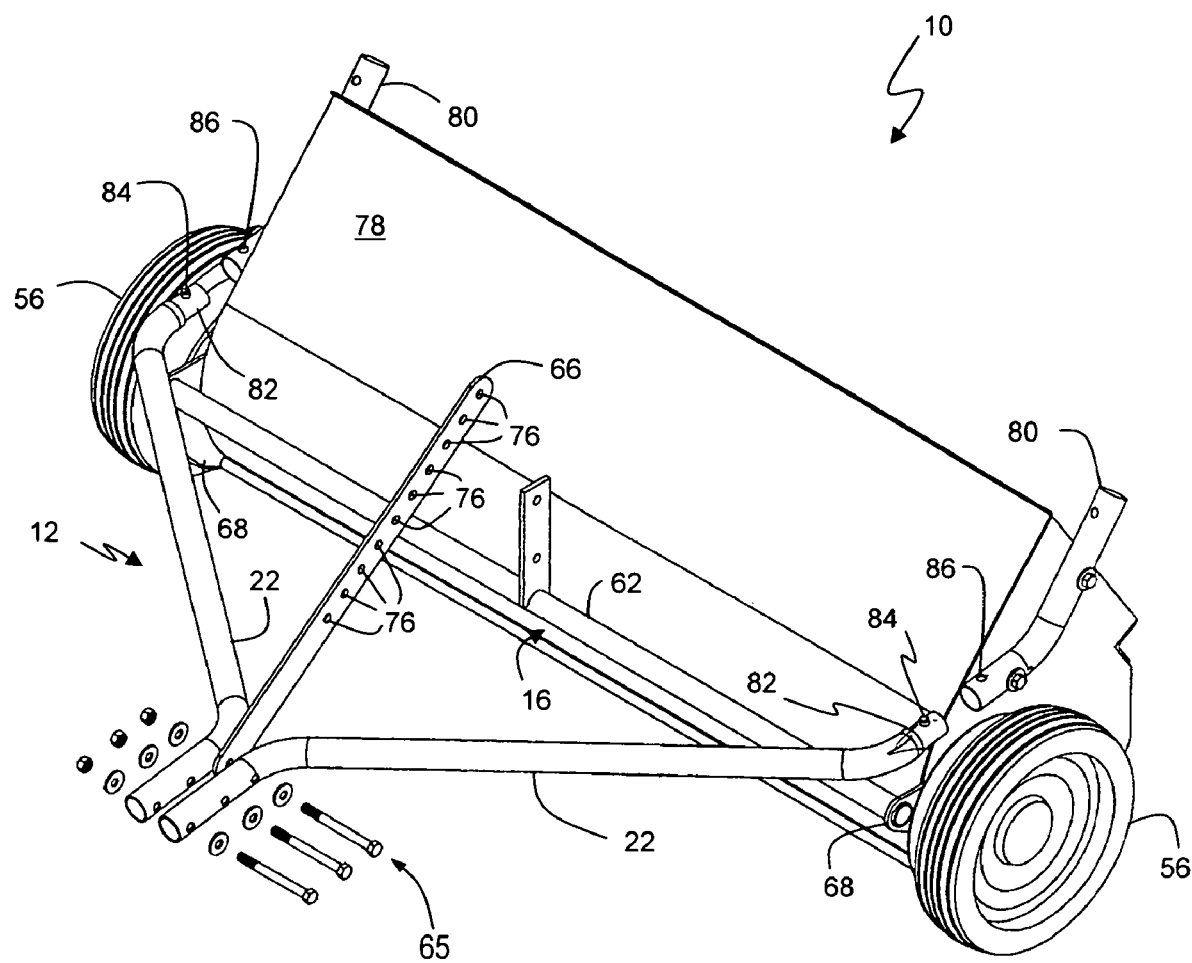
FIG. 11 is a perspective view of details of the connection of a tow bar to a lawn sweeper according to an embodiment of the present invention.
Figure 12:
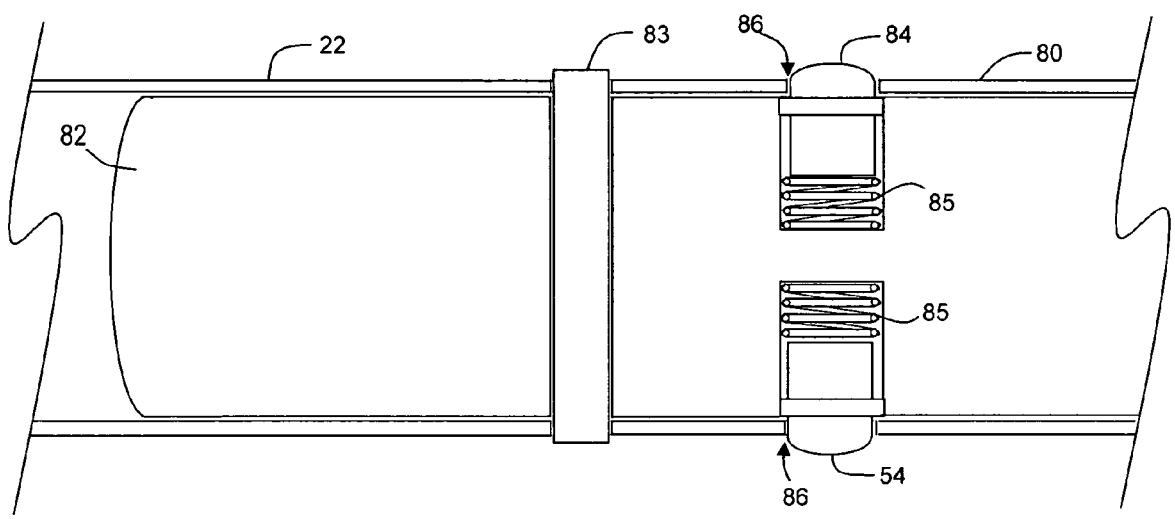
FIG. 12 is a view in section of a mounting fixture according to an embodiment of the present invention.

Referring now to FIGS. 11 and 12, hitch assembly 12 is generally rigidly attached to housing 78 by mounting tubes 80 affixed to the housing and associated connectors 82. In one embodiment of hitch assembly 12 the hitch assembly comprises a pair of tow tubes 22 which connect to sweeper assembly 14 via a pair of mounting tubes 80 mounted on the sweeper assembly. At the ends of each tow tube 22 is a connector 82, which is secured to the tube with a pin 83 inserted through corresponding apertures of the tow tube and connector. Connectors 82 have a diameter sufficient to allow the connectors to fit within mounting tubes 80. Connectors 82 may further contain one or more buttons 84, each of which are biased by a resilient element such as spring 85 to protrude from connector 82 and may extend a distance great enough to enter into corresponding apertures 86 of mounting tubes 80 to prevent unintentional removal of the connector from within the mounting tube.

During assembly of lawn sweeper 10 hitch assembly 12 and sweeper assembly 14 may be coupled to the lawn sweeper by forcing buttons 84 into connectors 82, inserting the connectors into corresponding mounting tubes 80 a sufficient distance and at the correct orientation to align the buttons with mounting tube apertures 86 such that the buttons extend into the mounting tube apertures, thereby securing the two assemblies together. The assemblies may likewise be separated by forcing buttons 84 into connectors 82 such that they are below the inside surface of mounting tubes 80, then separating the connector from the mounting tube.

Operation

With reference to FIGS. 1A, 3, 4, 10A and 10B, lawn sweeper 10 may be operated by first coupling the lawn sweeper to tow bar 20 of lawn tractor 46 and then adjusting the height of sweeper assembly 14. Lawn sweeper 10 may be attached to the drawbar 20 of a tractor or other tow vehicle utilizing hitch assembly 12. Referring now to FIGS. 3 and 4 in addition to FIGS. 1A and 1B, clevis 18 provides a plurality of connection positions 47 for connecting lawn sweeper 10 to the drawbar 20 connection of a vehicle. The different connection positions 47A, 47B and 47C enable a user to select a position wherein lawn sweeper 10 is coupled to a tow vehicle such that the hitch assembly 12 is generally level with the ground or oriented at some desired angle with respect to the ground. The selectable connection positions 47 also allow the angle of lawn sweeper 10 to be selected and adapted to varying heights of vehicle drawbar 20 connections of various types of tow vehicles. Although the embodiment provides connection positions 47A, 47B and 47C, other embodiments may utilize more or fewer connector members 24 to provide more or fewer connection positions. Further, the spacing between the clevis ends 34 of connector members 24 may be altered to adapt to varied vehicle drawbar 20 dimensions and applications.

To determine the proper attachment position within clevis 18 the height of the vehicle drawbar 20 above the ground surface may be measured and compared to a diagram, table or other data provided with lawn sweeper 10 wherein the measured height may correlate to a connection positions 47A, 47B and 47C, as shown in FIG. 3. Lawn sweeper 10 may then be properly attached at one of the determined connection positions 47A, 47B and 47C. Alternatively, in the absence of such a diagram or data, proper attachment may be achieved by raising hitch assembly 12 above the ground to a height at which tow tubes 22 are visually observed to be generally parallel to the ground. Then, by comparing the available openings in clevis 18 to the vehicle drawbar 20, one of connection positions 47A, 47B and 47C may be selected. The optimum connection position 47 allows lawn sweeper 10 to attach to the vehicle drawbar 20 such that tow tubes 22 are generally parallel to the ground when attached.

Once the proper connection position 47A, 47B or 47C for attachment of lawn sweeper 10 to the vehicle drawbar 20 is determined the lawn sweeper may be attached by removing hitch pin 26 from the clevis 18. The vehicle drawbar 20 may then be inserted into the pre-determined connection position 47A, 47B or 47C. Hitch pin 26 may then be reinserted into clevis 18 via openings 36 such that the vehicle drawbar 20 is retained within the clevis.

With lawn sweeper 10 attached to a tow vehicle the height of sweeper 14 may be adjusted to a desired position. As previously discussed, the height of sweeper assembly 14 for optimal operation of lawn sweeper 10 is determined based upon the type of surface to be swept and the type of debris to be swept, among other considerations. Once the height of sweeper assembly 14 is determined the height of sweeper assembly 14 may be adjusted by first removing clip 77 from pin 75 and then removing the pin from the apertures 74, 76 of lever 64 and height retention member 66 respectively, as shown in FIG. 1A. Referring now to FIGS. 10A and 10B, lever 64 may be used to pivot height adjustment bar 62 about its connection with sweeper assembly 14, thereby raising or lowering the sweeper assembly above the ground. In addition, the apertures 74 along the length of lever 64 may be utilized to retain the lever in a selected position by aligning a select aperture of the lever with a aperture of height retention member 66 and inserting pin 75. Clip 77 may then be reinserted into pin 75 to retain the pin within the apertures 74, 76.

As can be seen, height adjustment assembly 16 may be completely retained with little risk of slippage or loosening of the adjustment components. The present invention is less prone to slipping or changing, due to the securing of the connection between lever 64 and height retention member 66 with pin 75 and clip 77. Pin 75 is retained by clip 77 and is not subject to loosening during use, unlike the friction and compression devices of the current art. It should also be noted that lever 64 provides a mechanical advantage for ease of adjusting height adjustment assembly 16.

With additional reference to FIG. 5, lawn sweeper 10 may be operated by pulling it with the tow vehicle 46. Towing of lawn sweeper 10 causes wheels 56 to rotate as the lawn sweeper traverses the ground, thereby rotating gears 54 and, in turn, axle 50. As axle 50 is rotated, brush assembly 48 rotates and contacts the work surface 60. The sweeping of brushes 49 against the work surface 60 is generally sufficient to sweep debris away from the work surface and into a hopper or bag 53 attached to housing 78 wherein the debris may be collected. The spiraled brush assembly 48 of the present invention may provide increased force for sweeping between the confronting edge 58 of brush assembly 48 and the work surface 60, increasing the efficiency of debris collection. Further, the spiraled brush assembly 48 configuration may also provide lateral movement of debris across the length of the brushes which may give some benefits to sweeping efficiency and ability.

While the present invention has been shown and described with respect to a detailed embodiment thereof, it will be understood by those skilled in the art that changes in form and detail thereof may be made without departing from the scope of the claims of the invention. For example, clevis 18, 180 may be used with towed equipment other than lawn tractor 46, such as trailers and wagons, among others, as well as other types of vehicles such as tractors, bicycles or automobiles, among others.

What is claimed is:

1. A towable lawn sweeper, comprising:
a housing;
a hitch assembly rigidly coupled to the housing;
a sweeper assembly rotatably coupled to the housing, the sweeper assembly comprising:
an elongate axle;
a pair of brushes, each brush being coupled to a planar, elongate attachment bracket extending the length of the brush, each attachment bracket having a plurality of apertures therethrough;
a plurality of clamps, each clamp having an arcuate portion and a pair of planar portions opposingly extending from the arcuate portion, the planar portions each having an aperture therethrough; and
a set of fasteners,
a first brush being oriented such that its bristles extend away from the axle at a predetermined circumferential position at the first end of the axle, and such that its bristles extend from an opposing circumferential position at the second end of the axle, and
a second brush being oriented such that its bristles extend away from the first end of the axle at a circumferential position generally opposite those of the first brush at the first end of the axle, and such that its bristles extend from an opposing circumferential position at the second end of the axle, the opposing circumferential position being generally opposite that of the first brush, wherein the pair of brushes are secured to the axle with the clamps, the clamps being arranged in pairs and facially adjacent to each other such that the arcuate portion of each clamp conforms to the axle and the planar portions of each clamp are proximate the attachment brackets, apertures of the facially adjacent clamps and the apertures of the attachment brackets are in alignment with each other, a fastener extending through the aligned apertures to secure together the clamps, brushes and axle, thereby maintaining the orientation of the brushes.

2. The lawn sweeper of claim 1 wherein the bristles of the brushes are made from at least one of nylon, plastic, metal and organic fibers.

3. The lawn sweeper of claim 2 wherein the bristles are made having at least one of a smooth surface, rough surface, round cross-section, angular cross-section, monofilament and multi-filament.

* * * * *

UNITED STATES PATENT AND TRADEMARK OFFICE
CERTIFICATE OF CORRECTION

PATENT NO. : 7,610,646 B2  Page 1 of 1
APPLICATION NO. : 11/400930
DATED : November 3, 2009
INVENTOR(S) : Mark Zellefrow, Joseph Chattin and Richard Biggs It is certified that error appears in the above-identified patent and that said Letters Patent is hereby corrected as shown below:

Column 1, line 40, replace "devises" with --clevises--.

Signed and Sealed this

Twenty-ninth Day of December, 2009

David J. Kappos
*Director of the United States Patent and Trademark Office*